United States Patent [19]
Welzen

[11] Patent Number: 4,471,013
[45] Date of Patent: Sep. 11, 1984

[54] CORE STRIP FOR HONEYCOMB CORE PANELS

[75] Inventor: Joseph A. Welzen, Los Alamitos, Calif.

[73] Assignee: TRE Corporation, Beverly Hills, Calif.

[21] Appl. No.: 546,508

[22] Filed: Oct. 28, 1983

[51] Int. Cl.³ .............................................. B32B 3/12
[52] U.S. Cl. .................................. 428/116; 228/181; 228/173 C; 428/593
[58] Field of Search ................................ 428/116–118, 428/593; 228/173 C, 181

[56] References Cited

U.S. PATENT DOCUMENTS 2,959,257 11/1960 Campbell ............................ 428/116
2,983,038 5/1961 Johnson ........................... 428/116 X Primary Examiner—Henry F. Epstein
Attorney, Agent, or Firm—Spensley Horn Jubas & Lubitz

[57] ABSTRACT

A corrugated core strip for use in the formation of honeycomb core panels is formed by a punch forming operation which simultaneously forms flanges at the edges of the core strip. The punching operation causes the flanges to be gathered at the troughs of the corrugations. The gathering is accommodated by forming grooves in the flanges which extend toward the flange on the opposite edge of the strip. The use of thicker core strip materials is facilitated, and the configuration both simplifies the manufacture of honeycomb core panels and improves the characteristics of the panels.

9 Claims, 14 Drawing Figures

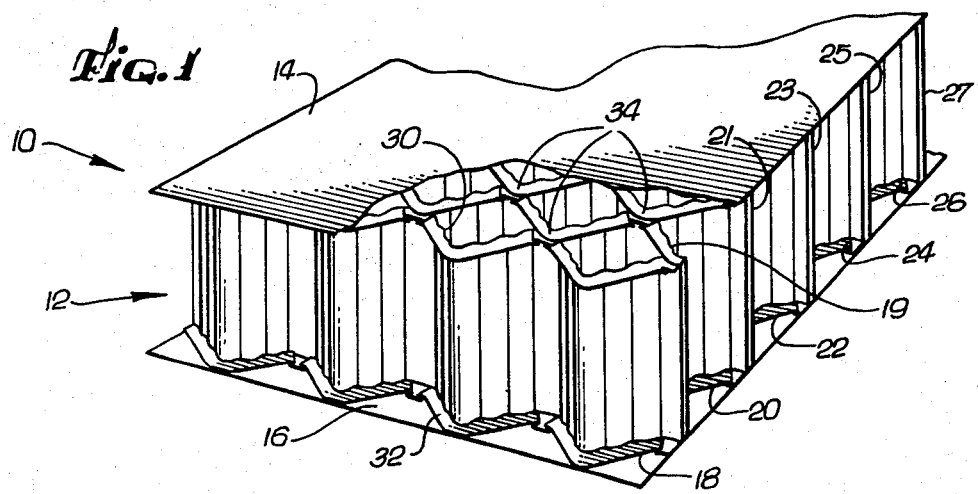
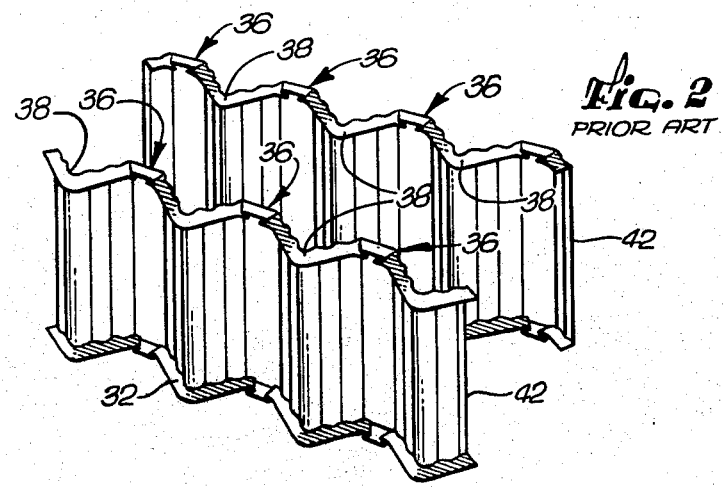
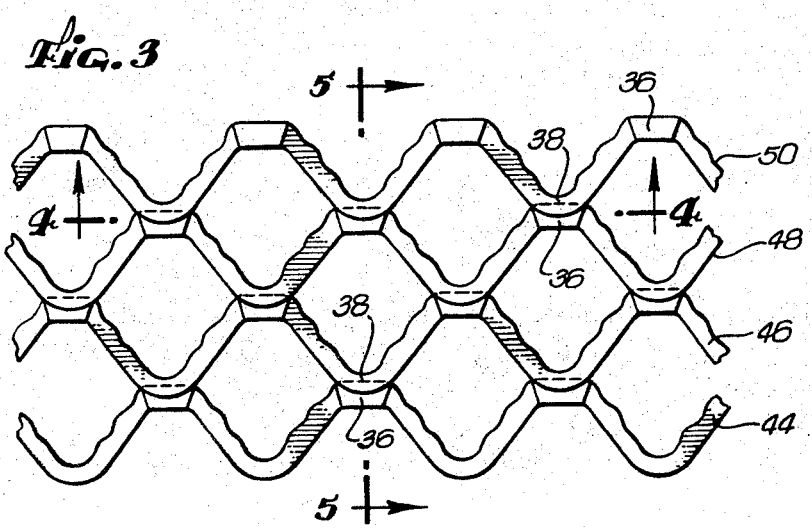

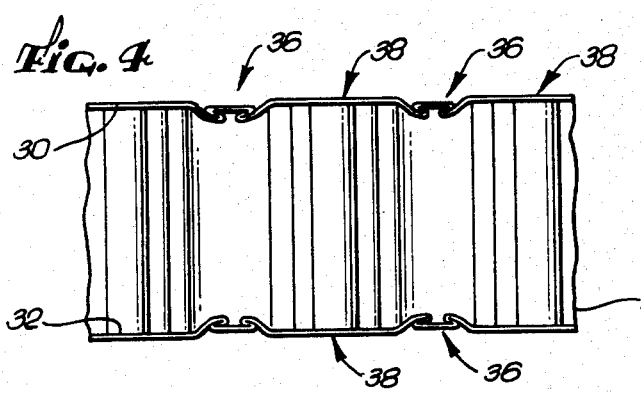
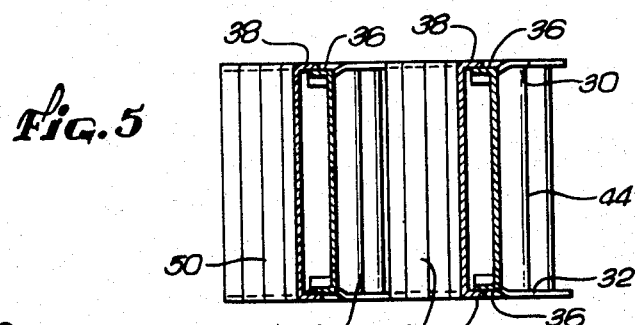
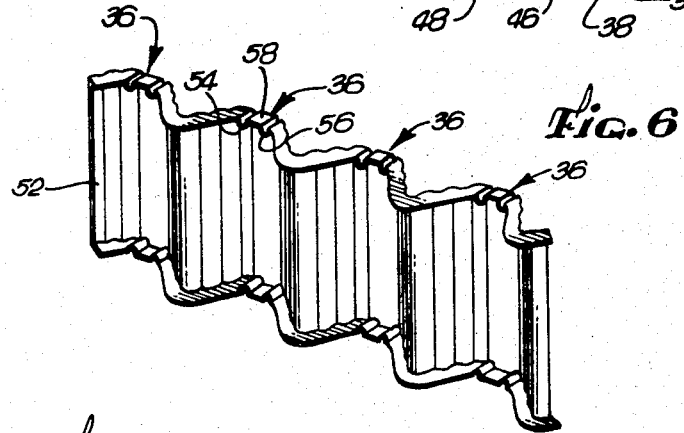
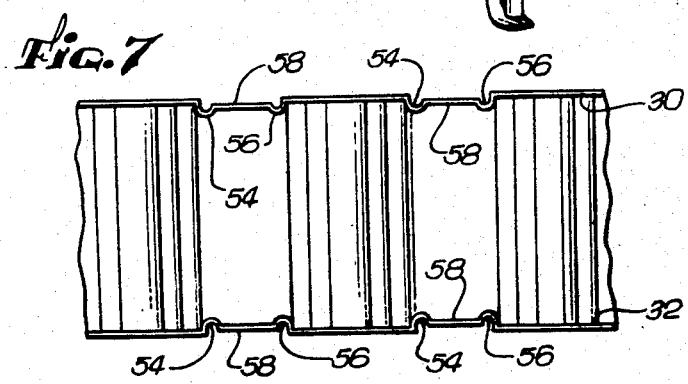

4,471,013

CORE STRIP FOR HONEYCOMB CORE PANELS

BACKGROUND OF THE INVENTION

1. Field of the Invention

The present invention relates to honeycomb core panels which are made of a thin metal material, e.g., titanium. Such panels are comprised of a honeycomb core sandwiched between a pair of face sheets. Typically, the core is formed of a plurality of corrugated ribbons or strips which are secured together by welding or otherwise to form a honeycomb structure. The face sheets are welded or diffusion bonded to the edges of the core ribbons. Such structures are characterized by very light weight and extreme rigidity. This type of panel is typically employed in aircraft and naval vessels.

2. Description of the Prior Art

In order to facilitate the welding of the face sheets to the honeycomb core, the core strips used to form the core are provided with flanges at their edges. These flanges are integral with the core strips and are formed during the punching of flat metal strips into the corrugated core strips. The flanges are formed by bending the edges of the core strip so as to be perpendicular to the corrugations. The core strip includes troughs and peaks, and the bending operation causes the flange material to be gathered at the trough areas.

In forming the honeycomb core, the core strips are positioned in an internesting relationship, with the flanges of one core strip ovelapping the flanges of an adjacent core strip. Typically, the portion of the flanges at the troughs in each strip are "joggled", i.e., bent inward slightly, to facilitate the internesting of the core strips. The portion of the flange adjacent the peaks of one core strip are slid over the portion of the flange at the troughs of another core strip, with the resulting structure presenting a substantially flat surface at the flanges for securing to the face sheets.

In prior art designs, the gathered portion of the flange at the trough is folded back upon itself during the bending operation which forms the flanges. The flanges thus have a triple thickness at the troughs. Although such a structure is adequate for many applications, its use is typically restricted to core materials having a thickness of about 5 mils or less. Because of the triple thickness of the flange at the trough, the buildup of material limits the thickness of material which can be used to form the core.

SUMMARY OF THE INVENTION

The present invention is directed to a core strip and method of forming the core strip in which the thickness of the strip material may be much greater than with prior art configurations. Instead of folding the gathered portion back on itself, the present invention accommodates the gathering at the troughs by forming the gathered portion into one or more grooves which extend toward the opposite flange of the core strip. The grooves serve to bring the material toward the center of the core strip so as to prevent it from interfering with the internesting with other core strips. In addition, the formation of the grooves serves to lower the flange at the troughs with respect to the remaining portion of the flange in order to facilitate the internesting operation and assure that a smooth surface will be presented to the face sheets.

BRIEF DESCRIPTION OF THE DRAWINGS

The invention will be described with reference to the accompanying drawings wherein:

FIG. 1 is a perspective view, partially cut away, of a honeycomb core panel;

FIG. 2 is a perspective view showing two prior art core strips;

FIG. 3 is a top plan view of a honeycomb core structure;

FIG. 4 is a plan view of a prior art core strip taken along lines 4—4 of FIG. 3;

FIG. 5 is a sectional view taken along lines 5—5 of FIG. 3 showing the internesting of core strips;

FIG. 6 is a perspective view of a core strip according to the present invention;

FIG. 7 is a front plan view of the core strip of the present invention;

DESCRIPTION OF THE PREFERRED EMBODIMENT

Figure 8:
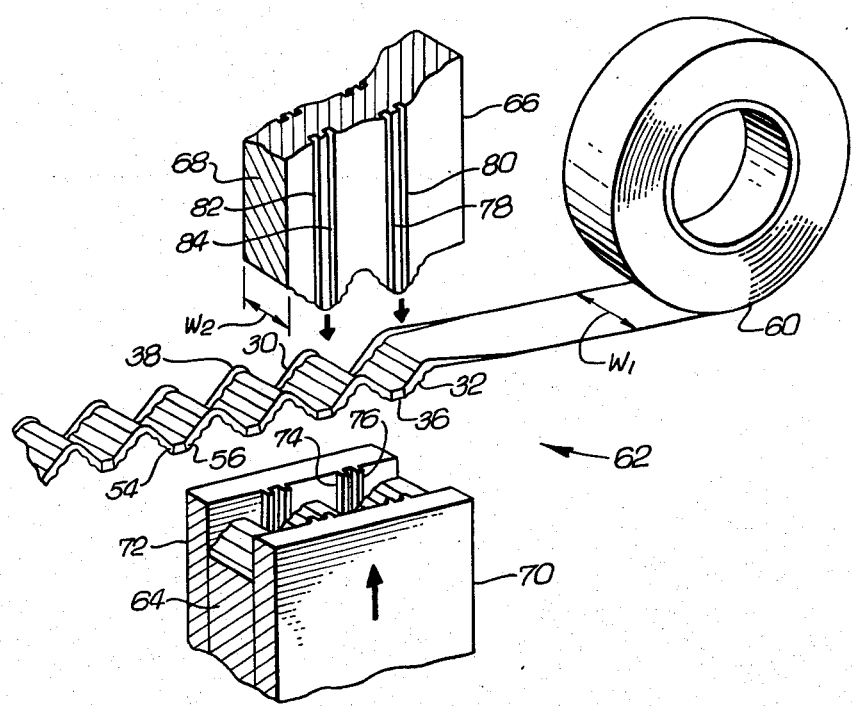
FIG. 8 is a diagrammatic perspective view showing the formation of the core strip of the present invention.

The following description is of the best presently contemplated mode of carrying out the invention. This description is made for the purpose of illustrating the general principles of the invention and should not be taken in a limiting sense. The scope of the invention is best determined by reference to the appended claims.

Referring to FIG. 1, a panel 10 is comprised of a honeycomb core 12 sandwiched between a pair of face sheets 14 and 16. The honeycomb core is comprised of a plurality of internested core strips, with core strips 18–27 being visible in FIG. 1. The core strips are corrugated strips which are formed from flat strips by means of a punching operation. Each of the core strips has an integral flange 30 and 32 at each edge thereof which presents a flat surface for connection to the face sheets. Contacting nodes 34 of the core strips are welded to one another along their length and the face sheets 14 and 16 are welded or diffusion bonded to the core strips at the flanges 30 and 32.

As previously mentioned, the flanges 30 and 32 are integral with the core strips. These flanges are formed during the punching operation and are bent up with respect to the corrugated core strip by means of a wiper element adjacent the punch. FIG. 2 is a perspective view of a pair of prior art core strips. In the punching operation, a plurality of nodes 34 including troughs 36 and peaks 38 are formed. When secured together a trough 36 of a core strip 40 internests with a peak 38 of a core strip 42.

Since the core strip is formed from a flat sheet, the punching operation and formation of the flanges 30 and 32 causes the flanges to be compressed, or gathered, at the troughs 36. In prior art core strips, this gathering is accommodated by folding the additional material back upon itself during the wiping action which forms the flanges. In addition, the area of the flanges at the troughs 36 is "joggled", i.e., pressed inward toward the opposite flange, so that the peak 38 of the flanges of an adjacent core strip can slide over the troughs 36 to achieve internesting. The joggling causes all of the flanges to be substantially coplanar so as to facilitate attachment of the face sheets.

FIG. 3 is a top plan view of the honeycomb core structure showing four core strips 44, 46, 48 and 50 in an internested relationship. FIG. 4 is a plan view of a portion of the core strip 50, showing the folding over of the flanges 30 and 32 in the area of the troughs 36. In addition, as a result of the joggling, the surface of the flanges 30 and 32 at the troughs 36 is spaced toward the opposite flange in order to accommodate the flanges of an adjacent core strip at the peaks 38. The joggling and internesting relationship are illustrated in FIG. 5.

The core strips are formed of a metal material such as titanium. Because of the triple thickness of the flange at the troughs 36 as indicated in FIG. 4, the thickness of material which may be used to form the core strips is limited to a maximum of approximately 5 mils. In addition, the joggling operation at the troughs is done in the punching process and cannot be controlled to an extremely close tolerance. The present invention is directed to a core strip which eliminates the joggle and the triple thickness buildup at the troughs and enables strips having a much greater thickness to be produced. Referring to FIG. 6, a core strip 52 in accordance with the present invention accommodates the gathering which occurs during the punching process by forming a pair of grooves 54 and 56 separated by a flat portion 58 at the troughs 36. Rather than folding the metal material back upon itself to form a triple thickness area, the extra material which is generated as a result of the gathering is brought toward the center of the core strip and back to the surface of the flange. The grooves 54 and 56 are thereby formed to compensate for the gathering effect. In addition, as shown in FIG. 7, the surface 58 is formed so as to be spaced inward with respect to the remaining portion of the flanges 30 and 32. This spacing facilitates the internesting of adjacent core strips.

The provision of the grooves 54 and 56 enables strip materials of much greater thickness to be employed. Since the gathering of material at the troughs is accommodated by forming grooves rather than folding the material back upon itself, the core strip material can be formed into the proper configuration with thicker materials, thus providing improved core strength. The forming operation is more consistent than the prior art operation and the core strips can therefore be fabricated to tighter tolerances which also enables the use of thicker core strip materials.

The formation of the core strips is illustrated in FIG. 8. A spool of titanium ribbon 60 is provided to a punch press 62 which includes a die 64, a punch 66, a pilot 68, and a pair of wiper elements 70 and 72. The width $w_1$ of the ribbon 60 is slightly greater than the width $w_2$ of the die 64, punch 66 and pilot 68. In operation, the pilot 68 is lowered to press a previously formed corrugation into contact with the die 64 so as to accurately position the ribbon with respect to the punch 66. The punch 66 is then actuated to form the next corrugation. As the corrugation is being formed, the die 64, punch 66 and pilot 68 slide relative to the wiper elements 70 and 72. This movement bends the material extending over the edges of the punch 66 upward to form the flanges 30 and 32. The punch 66 and pilot 68 are then lifted, the ribbon 60 is indexed and the punching process is repeated.

The elements of the punch press mechanism typically are formed of hardened steel. The wiper elements 70 and 72 each include a pair of linear, parallel protrusions 74 and 76 which are employed to form the grooves in the flanges 30 and 32 at the gathered portions 36. A pair of corresponding grooves 78 and 80 are located on the sides of the punch 66. In addition, grooves (not visible) are also located on the side of the die 64 collinear with the grooves 78 and 80 in order to accommodate the protrusions 74 and 76. In operation, as the wiper elements 70 and 72 form the flanges 30 and 32, the protrusions 74 and 76 will further bend the flanges at the troughs 36 in order to form the grooves 54 and 56. The grooves 54 and 56 and the protrusions 74 and 76 are accommodated in the punch 66 by the grooves 78 and 80. In addition, grooves in the previously formed corrugation are accommodated by grooves 82 and 84 formed in the pilot 68.

Figure 9:
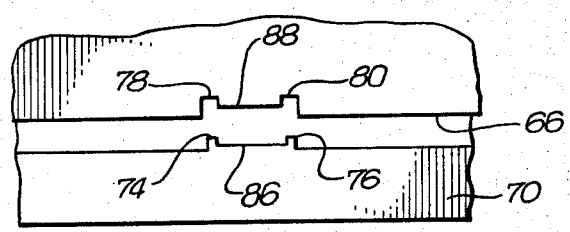
FIG. 9 is a top plan view showing a portion of die and wiper elements used to form the core strip.

The configuration of the protrusions 74 and 76 and grooves 78, 80, 82 and 84 (as well as those formed in the die 64) is illustrated in FIG. 9. It should be noted that the surface 86 of the wiper elements 70 and 72 between the protrusions 74 and 76 is raised with respect to the rest of the surface in order to properly form the surface 58 (FIG. 7). The surface 88 between the grooves 78 and 80 is correspondingly indented, as are the spaces between the grooves on the die and pilot.

Figure 10:
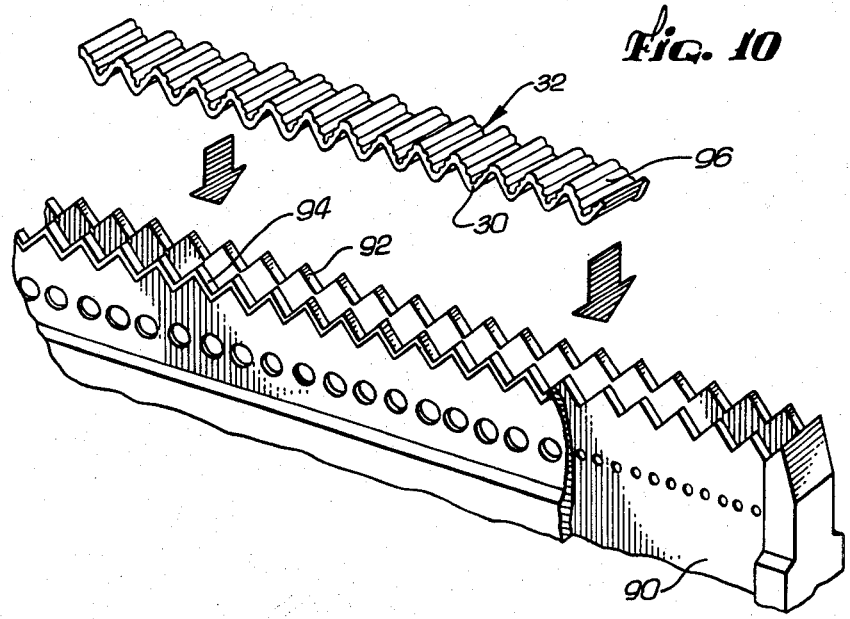
FIG. 10 is a perspective view showing an electrode to which the core ribbon is secured during the honeycomb core panel manufacturing process.
Figure 11:
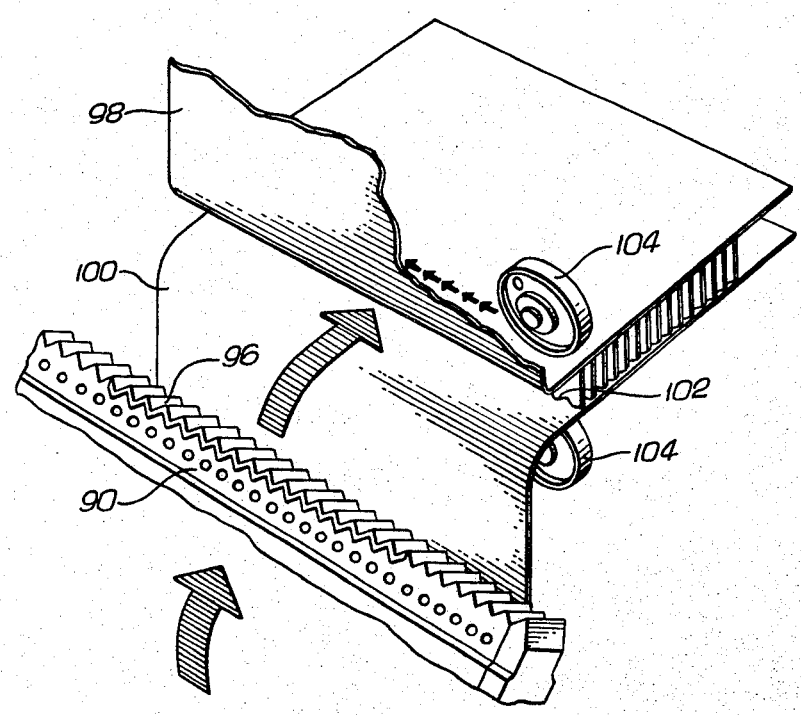
FIG. 11 is a perspective diagrammatic view illustrating the securing of core strips to face sheets.
Figure 12:
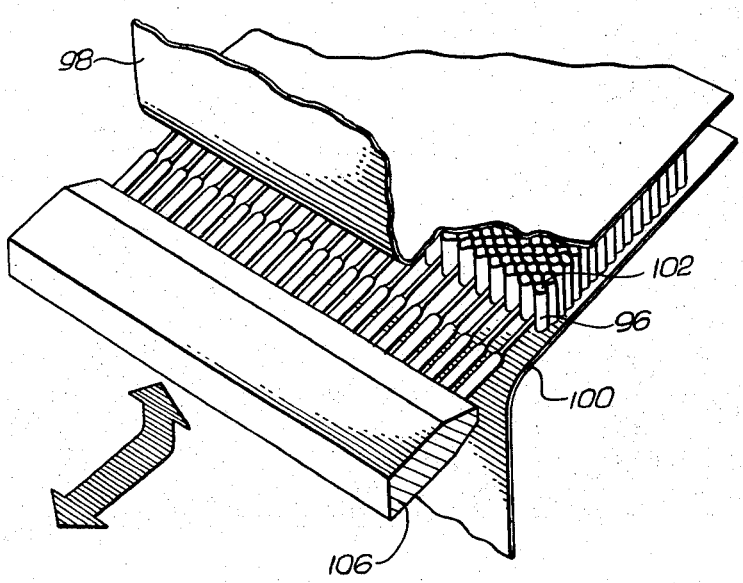
FIG. 12 is a perspective diagrammatic view showing welding of the nodes of adjacent core strips which have been previously secured to face sheets.

The production of a honeycomb core panel will be described with reference to FIGS. 10-12. Initially, an electrode bar 90 having a pair of electrode strips 92 and 94 extending from it is provided and a core strip 96 produced in accordance with the present invention is placed on the electrode strips so that the flanges 30 and 32 extend over the outside of the strips. The electrode strips and bar are typically formed of copper. The electrode strip with the core strip attached to it is then positioned between a pair of face sheets 98 and 100 and internested with a previously positioned core strip 102 as indicated in FIG. 11. The core strip 96 is then welded to the face sheets 98 and 100 by passing current through electrode wheels 104. The peaks of the core strip 96 are then welded to the troughs of the core strip 102 by a node welding apparatus 106 shown in FIG. 12.

Typically, the welding together of two completed panels is performed in the presence of an inert gas, and the area around the points to be welded must be purged prior to welding. This requires access to the interior of the last formed row of the honeycomb core. In the prior art, one method of providing this access is by perforating the core strips. The present invention eliminates the need for such perforations since the grooves provide the necessary access to facilitate the purging operation.

Figure 13:
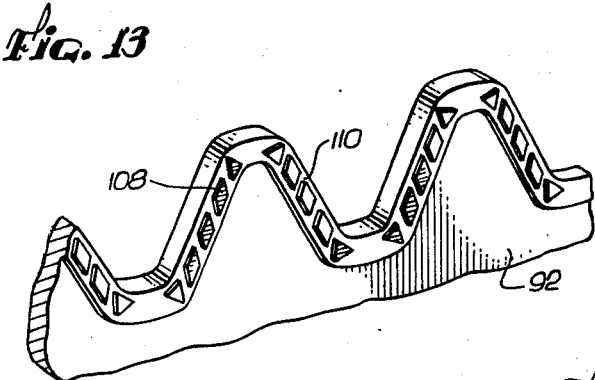
FIG. 13 is a perspective view of a prior art electrode configuration.
Figure 14:
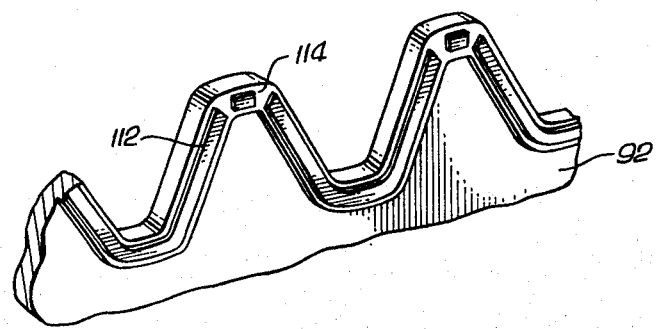
FIG. 14 is a perspective view of a preferred electrode configuration which is facilitated by use of the core strip of the present invention.

As an alternative or in addition to the use of a perforated core, prior art electrodes have been formed with a plurality of raised portions 108 as shown in FIG. 13. The relief pattern provides transmission paths 110 between the raised portions in order to facilitate the purging operation. However, this method has the disadvantage that welding occurs only at discrete spots along the flanges 30 and 32. As a result of the formation of the grooves at the troughs of the flanges, the present invention facilitates the use of a substantially continuous welding zone 112 as shown in FIG. 14. The relief pattern need be interrupted only at spaces 114 coresonding to the position of the grooves in the core strips. The flanges will therefore be welded to the face sheets over substantially their entire area, thus improving the core shear fatigue life of the panel.

In summary, the present invention provides an improved core strip configuration which accommodates the gathering of material caused as a result of the punch forming process, thus enabling substantially thicker core materials to be employed. The use of thicker core materials in turn greatly increases the strength of the honeycomb core panel. The formation of the grooves effectively eliminates the thickness limitations which exist with the prior art configuration. In addition, the joggle operation required for proper nesting is eliminated. Furthermore, the need for a perforated core and/or limited spot welding of the flanges to the face sheets is eliminated which both reduces the cost and improves the performance of the panel. The welding of the flanges to each other and then to a face sheet is improved because there is a single flat flange rather than a build up of three folded flanges.

What is claimed is:

1. A core strip for use in the production of honeycomb core panels, comprising:
a metal strip member having a plurality of corrugations defining troughs and peaks, wherein the edges of the strip perpendicular to the corrugations are bent over to form flanges, wherein the strip is formed by an operation which causes the flanges to include gathered portions at the troughs, wherein the gathered portions are spaced inward toward the opposite flange to facilitate internesting between peaks of one strip and troughs of another strip, said gathered portions each including at least one groove extending inward toward the opposite flange.

2. A core strip as in claim 1 wherein each gathered portion includes two grooves separated by a flat portion.

3. A core strip as in claim 2 wherein the thickness of the strip is at least 5 mils.

4. A core strip for use in the production of honeycomb core panels, comprising:
a metal strip having a plurality of corrugations;
a pair of flanges integral with the strip at the edges of the corrugations, said flanges having surfaces perpendicular to the corrugations and including gathered portions each having a pair of grooves extending inward toward an opposite flange and a substantially flat portion between the grooves, wherein the flat portions are spaced inward from the plane of the flange toward the opposite flange to facilitate internesting of the core strips.

5. A method of forming core strips for use in the manufacture of honeycomb core panels comprising the steps of:
providing a flat metal strip;
forming in the strip a plurality of corrugations having troughs and peaks;
bending over the edges of the strip to form flanges perpendicular to the corrugations, said flanges including gathered portions at the troughs; and
further bending each gathered portion inward toward the opposite flange to indent the gathered portion sufficient to space the gathered portions inward from the plane of the remainder of the flange to facilitate internesting of core strips to form a honeycomb core, and to additionally form at least one groove directed inward toward the opposite flange to accommodate the gathering which occurs at the troughs.

6. A method as in claim 5 wherein the step of bending each gathered portion includes the step of forming a pair of grooves separated by a substantially flat portion, said flat portion being spaced inward with respect to the plane of its corresponding flange by approximately the thickness of the metal strip.

7. A method as in claim 5 including the steps of providing a die defining the corrugations, said die having a width less than the width of the metal strip;
punch forming the strip with a punch corresponding to the die and having a width less than the width of the metal strip, said die and punch including collinear grooves alongside surfaces thereof;
providing a wiper element on each side of the die and punch, each wiper element having a flat surface and a protrusion which extends into the grooves of the die and punch; and
moving the die and punch relative to the wiper elements to bend the strip and form the flanges, said protrusions sliding within the grooves in the die and punch and simultaneously forming the grooves in the gathered portions of the flanges.

8. A method as in claim 5 including the step of forming a honeycomb core panel by:
(a) providing an electrode member having first and second corrugated spaced surfaces corresponding to the corrugations of the core strips;
(b) placing a first core strip on the electrode member with the flanges extending over the first and second surfaces of the electrode member;
(c) welding first and second face sheets to the flanges with the electrode member in place;
(d) removing the electrode member and placing a second core strip on it;
(e) positioning the second core strip adjacent the first core strip;
(f) welding the flanges of the second core strip to the first face sheets;
(g) welding the first core strip to the second core strip; and
repeating steps (d) through (g) for additional core strips.

9. A method as in claim 8 including the steps of:
evacuating the space between an outside core strip and an adjacent core strip in first and second panels via the grooves;
introducing an inert gas into said space in each panel; and
welding the panels together with said outside core strips in facing relation.

* * * * *